Patented May 27, 1952

2,597,964

UNITED STATES PATENT OFFICE 2,597,964

FLUID IMPERVIOUS CARBON ARTICLE AND METHOD OF MAKING SAME

Lester L. Winter, Fairview Park, Ohio, assignor to Union Carbide and Carbon Corporation, a corporation of New York No Drawing. Application November 9, 1951, Serial No. 255,737

6 Claims. (Cl. 117—69)

The invention relates to fluid-impervious carbon articles and to a method of making such articles.

One method of making carbon articles comprises mixing particles of solid carbonaceous material with a fluid carbonaceous binder such as pitch or tar, forming the mixture to a desired shape, and then baking the mixture. The baking operation drives volatile materials from the mixture and converts a part or all of the carbonaceous material to solid carbon, either amorphous or graphitic, depending upon the composition of the mixture and the time and temperature of heating.

Baked carbon articles produced in this manner are ordinarily porous, and are permeable to many fluids, because of the liberation of volatile materials during the baking operation. To meet the demand of industry for fluid-impervious carbon articles for some purposes, the natural pores and crevices of baked carbon articles are filled with synthetic resins, for example of the furan type as disclosed in U. S. Patent No. 2,174,887, produced in situ. Resin-impregnated baked carbon articles are quite impervious to fluids and have many excellent characteristics which have led to their wide use in industry. One disadvantage they possess, however, is their inability to withstand prolonged exposure to elevated temperatures much above about 150° C. to 200° C. because the organic materials tend to decompose at such temperatures and this decomposition results in damage to the articles by spalling.

The principal objects of the present invention are to provide fluid-impervious carbon articles capable of withstanding exposure to elevated temperatures above about 150° C., and to provide a method of making such articles.

These objects are achieved by the invention which comprises a method of impregnating a normally porous carbon article with a heat-resistant siliceous material such as fused silica and glasses containing at least 70% silica. The invention also includes a substantially fluid-impervious carbon article at least the majority of the pores of which are substantially filled with such a material at least on its surface portions.

The method of the invention comprises two basic steps: the formation of a metal carbide in the pores of a carbon article to be treated, and the impregnation of the "carbided" pores with the siliceous material. The metal carbide wets the pore walls, and the molten siliceous material in turn wets the carbide, filling the pores and adhering strongly to their carbided walls. These steps may be so carried out as to impregnate an article uniformly throughout its cross section or as to provide a shallow layer or "case" extending only a short distance beneath its surface.

Investigation of the method of the invention has indicated that any metal carbide selected from the group consisting of carbides of the metals molybdenum, vanadium, chromium, titanium, zirconium and tantalum may be used in the first step. Although carbides of all of the metals of this group have been used successfully, the most generally preferred is molybdenum carbide, and for conciseness the method of the invention will be described with particular reference to the use of molybdenum carbide.

The formation of metal carbide in the pores of a carbon article may be accomplished in a variety of ways. For instance a carbide-forming metal may be placed in powder form on the article to be treated and converted to metal carbide by heat. Most conveniently, however, a compound of the carbide-forming metal, in liquid form, for example, a solution of the metal in acid or an acid of the metal or a solution of a salt of the metal, is brought into contact with the article to be treated, by dipping the article in the liquid or by brushing or spraying the liquid onto the article, and the compound is eventually converted to metal carbide by heating in a non-oxidizing or reducing atmosphere to a carbide-forming temperature. For instance to produce molybdenum carbide in the pores of an article to be treated, the article may be dipped into a solution of molybdic acid or of ammonium molybdate and held in the solution until penetration of the solution into the pores has occurred. The article is then removed from the solution and baked, preferably in a hydrogen atmosphere, at a temperature of about 1200° C. at which temperature molybdenum carbide is formed.

After metal carbide has been formed in the pores of the carbon article, the article is subjected to the second step of the method, impregnation with a molten siliceous material such as silica or high-silica glass (glass containing at least 70% silica). These materials are not only not decomposed by heat up to the neighborhood of their melting range, but also do not react with carbon under the conditions of use. Wherever metal carbide exists in the pores of the article, the article will be wet by the molten material. To aid in impregnation, pressure may be applied in conventional manner, the degree of pressure to be applied depending in part on the material used and the degree of impregnation desired. When the article is sufficiently impregnated, it is permitted to cool, and the impregnant to solidify. There is thus produced an article the pores of which are substantially filled with a fused inorganic compound, rendering the article substantially impervious to fluids. By "fused" as used herein and in the appended claims is meant melted and solidified.

As indicated, the impregnant used in the second step of the method of the invention may be a high-silica glass. Typical glass compositions which may be used are:

96% silica; 3% boric oxide

73% to 82% silica; 3% to 10% sodium oxide; 1% to 4% potassium oxide; 0 to 1% lime; 0 to 10% lead oxide 70% to 75% silica; 16% to 23% potassium oxide; 5% to 15% lime plus magnesia Borosilicate glass composed of 80% silica; 12% boric oxide; 4% sodium oxide; remainder mixed oxides Borosilicate glass composed of 80% silica; 13% boric oxide; 4% sodium oxide; 2% alumina All of these glasses are characterized by a working temperature (temperature at which viscosity is $10^4$ poises) of 1000° C. or higher.

The following is a detailed description of the completed method of the invention as typically practised for the production of a carbon article which is substantially impervious to fluids throughout its entire cross section and is given by way of example.

A weighed cylinder of graphite one inch in diameter by two inches long was treated with a concentrated aqueous solution of ammonium molybdate by placing the graphite cylinder in a covered vessel, evacuating the vessel and introducing the ammonium molybdate solution into the vessel and into contact with the graphite cylinder. After ten minutes the cylinder was dried at a pressure of about twenty millimeters of mercury. Thus the water was removed leaving the ammonium molybdate in the pores of the article. The cylinder was again weighed, and then heated in hydrogen to a temperature of about 1200° C. to convert the ammonium molybdate in its pores to molybdenum carbide. The entire treatment was repeated until calculation showed that about 4% of the total weight of the article was molybdenum in the form of molybdenum carbide.

The molybdenum carbide-impregnated article was then placed in a pressure chamber with a solid powdered glass containing about 80% $SiO_2$; 13% $B_2O_3$; 4% $Na_2O$; 2% $Al_2O_3$, enough of the glass being provided so that when it was later melted the article would be completely immersed in molten glass. The article and glass were then heated to about 1400° C. to 1500° C. and the chamber was evacuated to a pressure of about twenty millimeters of mercury to remove entrapped gases from the graphite article. The chamber was maintained at this low pressure for about two minutes, and the pressure was then raised by the introduction of nitrogen to about 150 pounds per square inch to assure penetration of the glass into the pores of the article. The pressure was maintained for about five minutes and was then relieved and the article permitted to cool.

The procedure above described may be modified to produce instead of an article impregnated throughout its cross section one impregnated only in a shallow surface layer. Since the impregnant will wet the article only where metal carbide exists, this may be accomplished conveniently as well by limiting the penetration of carbide-forming material as by control of the second step of the method.

This application is a continuation-in-part of my application Serial No. 773,315, filed September 10, 1947.

What is claimed is:

1. A method which comprises producing, in situ in, and integral with the pore walls of, at least those pores of a porous carbon article at its surface portions, a carbide of a metal selected from the group consisting of molybdenum, vanadium, chromium, titanium, zirconium, and tantalum; impregnating such carbided pores with a molten siliceous material having a working point of at least 1000° C.; and solidifying said material in situ by cooling, thus rendering said article substantially impervious to fluids.

2. A method which comprises producing, in situ in, and integral with the pore walls of, at least those pores of a porous carbon article at its surface portions, a carbide of a metal selected from the group consisting of molybdenum, vanadium, chromium, titanium, zirconium, and tantalum, by reacting with the carbon of such article a carbide-forming material containing a selected metal of said group; impregnating said pores containing carbide with a molten material selected from the group consisting of silica and high-silica glass; and solidifying said material in situ by cooling, thus rendering said article substantially impervious to fluids.

3. A method which comprises impregnating at least those pores of a porous carbon article at its surface portions with a solution of a carbide-forming compound of a metal selected from the group consisting of molybdenum, vanadium, chromium, titanium, zirconium, and tantalum; baking said article at a temperature sufficient to cause said compound to react with the carbon of said article, thereby forming metal carbide in situ and integral with the walls of said pores; introducing into such carbided pores a molten glass containing at least 70% $SiO_2$; and solidifying said glass by cooling, thus rendering said article substantially impervious to fluids.

4. A fluid-impervious article composed of a body of normally porous carbon at least the majority of the pores of such body in at least its surface portions containing, integral with the walls thereof, a carbide formed in situ of said carbon body and a metal selected from the group consisting of molybdenum, vanadium, chromium, titanium, zirconium and tantalum; and adhering to such carbide and substantially filling such carbided pores a fused siliceous material selected from the group consisting of silica and high-silica glass.

5. An article as defined in claim 4 in which said glass is a borosilicate glass.

6. An article as defined in claim 4 in which said carbide is molybdenum carbide.

LESTER L. WINTER.

REFERENCES CITED

The following references are of record in the file of this patent:

UNITED STATES PATENTS

| Number | Name | Date |
| --- | --- | --- |
| 895,531 | Acheson | Aug. 11, 1908 |
| 1,098,794 | Fleming | June 2, 1914 |
| 1,867,524 | Orne | July 12, 1932 |
| 2,271,995 | Baroni | Feb. 3, 1942 |
| 2,282,098 | Taylor | May 5, 1942 |
| 2,414,514 | Elsey | Jan. 21, 1947 |
| 2,418,420 | Moberly | Apr. 1, 1947 |